3,172,889
PROCESS FOR THE SEPARATION OF 2-METHYL-3-PIPERIDINOPYRAZINE SULFATE FROM A MIXTURE COMPRISING 2-METHYL-3-PIPERIDINOPYRAZINE AND 2-METHYL-6-PIPERIDINOPYRAZINE
George Conrad, Irvington, and Jerome Genzer, Livingston, N.J., assignors to Warner-Lambert Pharmaceutical Company, Morris Plains, N.J., a corporation of Delaware
No Drawing. Filed Dec. 9, 1963, Ser. No. 329,266
2 Claims. (Cl. 260—250)

This invention relates to the production of 2-methyl-3-piperidinopyrazine sulfate and relates more particularly to a novel process for the efficient and economical separation of 2-methyl-3-piperidinopyrazine sulfate from an isomeric mixture of 2-methyl-3-piperidinopyrazine and 2-methyl-6-piperidinopyrazine in excellent yields and in high purity.

U.S. patent application, Serial No. 180,342, filed March 16, 1962, now abandoned discloses and claims a new anti-depressant composition comprising 2-methyl-3-piperidinopyrazine

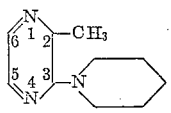

and its corresponding acid addition salts. These compositions, for example, have been found to be useful in the treatment of psychotic disorders.

This compound may be prepared, for example, by reacting 2-methyl-3-chloropyrazine with piperidine. Since the sulfate salt is the form preferred for use in pharmaceutical dosage forms, the free base produced by this reaction is then treated with an equimolar weight of sulfuric acid to give the corresponding acid addition salt. However, it has been found that the 2-methyl-3-piperidinopyrazine base obtained frequently contains a considerable amount of 2-methyl-6-piperidinopyrazine which is formed as a by-product from any 2-methyl-6-chloropyrazine which is present as an impurity in the initial reaction mixture. Obviously, for the 2-methyl-3-piperidinopyrazine to serve as a desirable therapeutic agent, it is essential that the compound be of satisfactory purity and free of undesirable isomers. In processes previously employed it has been found necessary to include a purification procedure, which comprises treating an ethereal solution of the mixture of isomers with hydrogen chloride. The 2,6 isomer being less soluble precipitates as the corresponding hydrochloride salt while the desired 2,3 isomer remains in solution. After removal of the precipitate 2-methyl-6-piperidinopyrazine hydrochloride by filtration, the filtrate is then further treated to recover 2-methyl-3-piperidinopyrazine hydrochloride as a precipitate.

The salt thus obtained is then neutralized with a base such as sodium hydroxide and the free base recovered. When the free base is reacted with an equimolar amount of sulfuric acid, the sulfate salt is formed. As an alternate process for the separation of these isomers, the use of fractional distillation has been suggested.

While the foregoing procedure is satisfactory for the production and separation of the sulfate salt in limited quantities, it is clearly inadequate when large quantities are to be prepared. Furthermore, the intermediate step involving the use of hydrogen chloride and the isolation of the free base from the hydrochloride salt is a step which adds materially to increasing the cost of manufacture of this important therapeutic substance.

It is thus quite obvious that there is a need for a more efficient and economical process for separating 2-methyl-3-piperidinopyrazine sulfate from its commonly encountered isomer.

Accordingly, a primary object of this invention is the provision of a direct and inexpensive process for the separation of 2-methyl-3-piperidinopyrazine sulfate from the reaction mixture obtained when 2-methyl-3-chloropyrazine is reacted with piperidine and the 2-methyl-3-piperidinopyrazine formed is then converted directly to its sulfate salt without any necessity for intermediate isolation and purification steps.

Another object of this invention is the direct production of 2-methyl-3-piperidinopyrazine sulfate in a highly purified form.

A further object of this invention is to provide an improved process for the production of 2-methyl-3-piperidinopyrazine sulfate suitable for large scale operation.

Other objects of this invention will appear from the following detailed description.

It has been found that the objects of the present invention are attained in the following manner. According to the process of this invention, the starting materials, namely, 2-methyl-3-chloropyrazine containing some quantities of the isomer 2-methyl-6-chloropyrazine and an excess of from 20 to 30% by mols of piperidine are refluxed together in xylene for about 24 hours. The reaction mixture after filtration of piperidine hydrochloride and removal of xylene in vacuo is assayed to determine the amount of each isomer present.

This assay may be effected, for example, by gas-liquid chromatography techniques. Thus, an aliquot portion of the reaction mixture is injected into a stainless steel column, 6 feet long and 0.180 inch internal diameter packed with 2.0% Carbowax 20,000 adsorbed on Gas-Chrom Z having a mesh size of 80 to 100. The column temperature is programmed for 100° C. to 180° C. at a rate of 10°/min. while an inert gas such as helium passes through the column at a rate of 45 ml./min. at 180° C. column temperature. Xylene, 2-chloro, 3 or 6 methylpyrazine and the two isomers have different retention times and are completely resolved on the column.

The components elute in the following order:

Xylene
2-chloro-6-methylpyrazine
2-chloro-3-methylpyrazine
2-methyl-3-piperidinopyrazine
2-methyl-6-piperidinopyrazine The ratio of each component is determined by measuring the area under each peak and correcting these results by applying the appropriate multiplication factor. These factors derived from a flame detector are:

Xylene _____ 0.58
2-chloro-3 or 6 methylpyrazine _____ 1.59
2,3 isomer _____ 1
2,6 isomer _____ 1

The crude bases are dissolved in five times by volume of methylethyl ketone. To the resulting ketonic solution kept at 0° to 5° C. is added a weight of sulfuric acid which will react with the 2,6 isomer present based on the assay. Thus, for example, 2.05 kg. of 96% sulfuric acid is added to 13.46 kg. of an isomeric mixture containing 26.6% of the 2,6 isomer. We have found quite surprisingly that under these carefully controlled conditions the 2-methyl-6-piperidinopyrazine sulfate readily forms at 0° to 5° C. and, being insoluble in methylethyl ketone, separates as a precipitate and may be removed by filtration. The mother liquor containing primarily the desired 2,3 isomer is further reacted with a weight of sulfuric acid based on the assay ot form 2-methyl-3-piperidinopyrazine sulfate. This salt formation is effected best at 25 to 30° C.

In order to further illustrate this invention, the following example is given.

*Example*

Into a 50 gallon glass-lined Pfaulder kettle is charged in succession, 10.286 kg. (80 mol) 2-methyl-3-chloromethylpyrazine, 16.339 kg. (192 mol) piperidine or 20% excess and 12 liters xylene. The resulting mixture is refluxed with constant stirring for 24 hours. It is then cooled to 30° C. and filtered through a white ceramic filter. The filter cake is then washed portionwise with 13 liters of xylene. The xylene is then removed at 135° C. with a vacuum of about 40 mm. to give 13.46 kg. (76 mol.) of an isomer mixture representing about a 95% yield of crude base containing 2-methyl-3-piperidinopyrazine and 2-methyl-6-piperidinopyrazine with small amounts of xylene and unreacted pyrazine starting material. An aliqut portion is assayed to determine the exact amount of each of the isomers present. For example, it has been found that the mixture of crude bases obtained in accordance with the above reactions contains 26.6% of 2-methyl-6-piperidinopyrazine, 62.6% of 2-methyl-3-piperidinopyrazine, 3.3% of the starting material and 7.5% xylene. These percentages will, of course, vary slightly from batch to batch. This isomeric mixture is then charged into a 100 gallon glass-lined Pfaulder kettle and 67.3 liters of methylethyl ketone added or about 5 times the weight of the crude bases. The resulting ketonic mixture is then chilled to 5° C. and 2.05 kg. of 96% sulfuric acid is added carefully. After the reaction mixture has been kept at 50 C. for about 30 minutes, it is filtered through a ceramic filter. The filter cake contains substantially 2-methyl-6-piperidinopyrazine sulfate and weighs about 5.04 kg. after being dried to constant weight at 60° C.

To the filtrate is charged 500 grams of Darco-G60 (activated charcoal) and warmed to 50° C. with stirring for 15 minutes. The resulting mixture is filtered through Super-Cel and washed with methylethyl ketone until the total volume is 202 liters or 15 times the volume of the original mixed bases. This filtrate is then transferred to a clean kettle and over a period of 15 minutes and at a temperature range of 25 to 30° C., to 4.8 kg. of 96% sulfuric acid is carefully added while stirring. When the addition of sulfuric acid is complete, the mixture is refluxed for 15 minutes and then cooled at 0 to 5° C. for at least 3 hours maintaining stirring. The precipitate that separates is removed by filtration to give 2-methyl-3-piperidinopyrazine sulfate. Purification of this material is effected in the following manner. The crude 2-methyl-3-piperidinopyrazine sulfate is dissolved in 29 liters of isopropyl alcohol with heating and stirring. The resulting clear solution is cooled to 5 to 10° C. and allowed to set for about 18 hours. It is then filtered and the solids are washed with 5.8 liters of ice cold isopropyl alcohol. The solids are then dried to constant weight at 60° C. under a vacuum of 27 inches to give 9.36 kg. of pure 2-methyl-3-piperidinopyrazine sulfate.

It is to be understood that the foregoing detailed description is given merely by way of illustration and that many variations may be made therein without departing from the spirit of our invention.

Having described our invention, what we desire to secure by Letters Patent is:

1. Process for obtaining 2-methyl-3-piperidinopyrazine sulfate comprising the steps of:
   (*a*) adding methylethyl ketone to an isomeric mixture consisting essentially of 2-methyl-3-piperidinopyrazine and 2-methyl-6-piperidinopyrazine at a ratio of 5 parts by volume of said ketone to 1 part by weight of said isomers,
   (*b*) adding to the resultant ketonic solution, sulfuric acid in an equimolar ratio to the 2-methyl-6-piperidinopyrazine present,
   (*c*) cooling said ketonic solution to a temperature of about 0° to 5° C.,
   (*d*) separating the insoluble precipitate from the mixture,
   (*e*) treating the mother liquor with sulfuric acid in an equimolar ratio to the 2-methyl-3-piperidinopyrazine present, and at a temperature range of from 25° C. to 30° C. and
   (*f*) recovering the precipitate thus formed.

2. Process in accordance with claim 1 wherein said inert solvent is xylene.

No references cited.